J. A. ROBY AND J. Z. TONDULT.
AUTOMOBILE RIM AND WHEEL.
APPLICATION FILED JAN. 31, 1920.
1,432,415.                                    Patented Oct. 17, 1922.
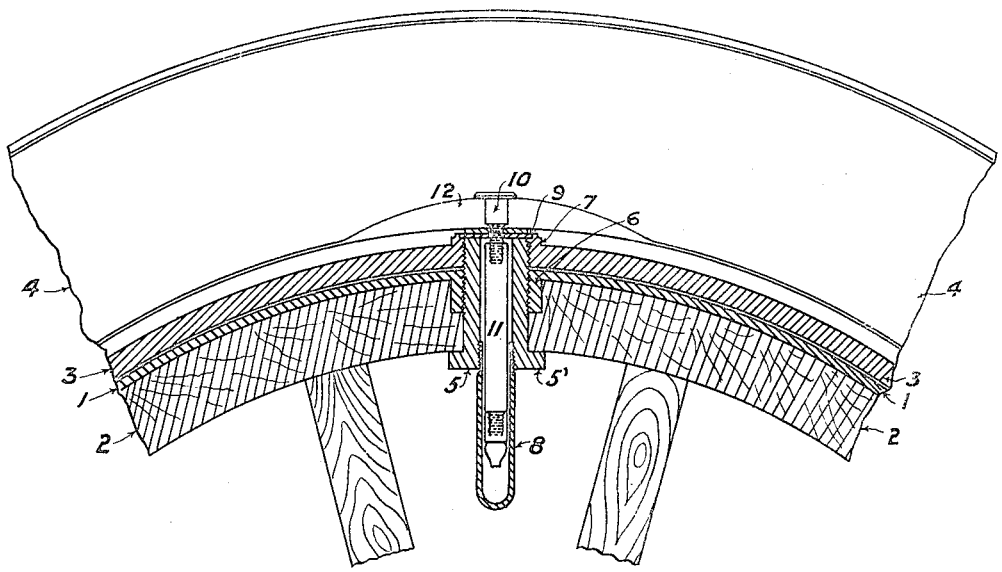
Fig. 2.
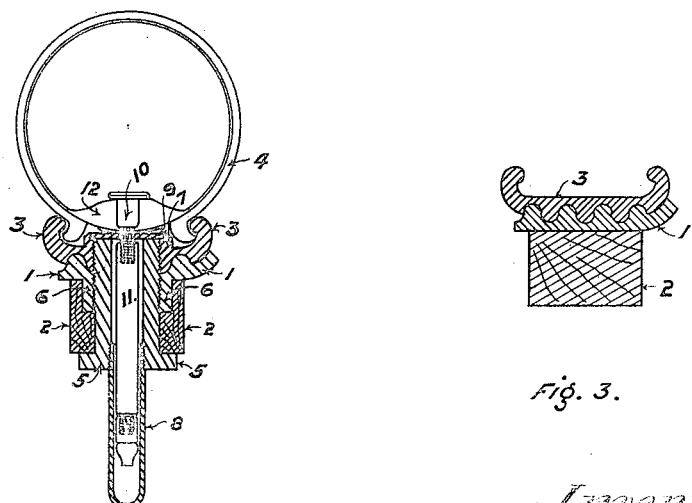
Fig. 1.                                Fig. 3.
Inventors:
Joseph A. Roby
Joseph Z. Tondult
By William C. Linton
Attorney Patented Oct. 17, 1922.

1,432,415

UNITED STATES PATENT OFFICE.

JOSEPH A. ROBY AND JOSEPH ZUNON TONDULT, OF EDMONTON, ALBERTA, CANADA.

AUTOMOBILE RIM AND WHEEL.

Application filed January 31, 1920. Serial No. 355,416.

*To all whom it may concern:*

Be it known that we, JOSEPH A. ROBY and JOSEPH Z. TONDULT, both subjects of the King of Great Britain, residing at Edmonton, Province of Alberta, Canada, have invented certain new and useful Improvements in Automobile Rims and Wheels; and we do hereby declare that the following is a full, clear, and exact description of the invention, such as will enable others skilled in the art to which it appertains to make and use the same.

The present invention relates to automobile rims and wheels and more particularly to the rims of same.

The principal object of this invention is to provide an automobile wheel rim so designed and constructed as to afford the quicker changing of tires thereon.

With the above and other objects in view which may appear as inherently related with the scope and nature of the invention, reference is now to be had to the hereunto annexed drawings wherein the different parts being designated by numeral characters throughout the several views are identified in this description by similar and corresponding numeral characters.

Of the above mentioned drawings:

Figure 1 is a cross-section of an automobile wheel through the valve;

Figure 2 is a longitudinal section of part of said wheel through the valve; and, Figure 3 is a cross-section of the rims and wheel away from said valve.

In view of fully disclosing the invention, reference is now to be had more particularly to the above drawings which are collaterally related with this description.

The iron rim 1, secured to the wood felly of the wheel 2 in the usual way, has its surface formed with threads which are sufficient in number to fill the width of the rim of said wheel, and, which mesh in with and securely keep in place the threads of rim 3 which supports the rubber tire 4. These threads consist of any number and of any section, as may be deemed necessary according to the width of the wheel.

Rim 1 is pierced by a hole extending through socket 6 formed therewith and which projects down into the wood felly 2 of the wheel in the form of a tube. This socket is screw threaded internally, so as to permit the screwing in of tube 5.

Rim 3 is threaded on its under surface to screw on to rim 1, and, is pierced by a hole with a tube nut 7 formed on the upper surface. Said hole and nut are screw threaded internally to permit the screwing in of tube 5.

Tube 5 is a steel tube which is screw threaded at one end externally so as to screw into rims 1 and 3. The other end of tube 5 is screw threaded internally so as to receive the valve cover 8, and, is formed with a nut shaped end 5' so as to allow for screwing and unscrewing when rim 3 is required to be changed.

Tube 5 passes through the wood felly 2 of the wheel, screws into socket 6 and rim 1, then into rim 3 and nut 7 which it holds and firmly retains in position, thereby making it impossible for rim 3 to move either way.

Tube nut 7 has a collar 9 let into its upper surface which is pierced with a screw threaded hole for screwing on to the valve 10 of the air tube which it holds in position in the centre of tube 5.

As the valve from the air tube 10 cannot project beyond the underside of rim 3, it is extended with a tube 11, which screws on to the valve after tube 5 has been screwed into position, and, is of sufficient length to extend beyond the wood felly 2 of the wheel, so as to allow connection of the air pump, and is screw threaded externally at one end so as to provide for the connection of the valve, and, internally at the other end so as to provide for the connection with the air tube.

On the inside of the air tube is a solid rubber washer 12 which is adapted for the purpose of supporting the valve tube 10 and facilitating the screwing on of tube 11.

The cover of the valve 8, which is there used to protect said valve against dust, is screw threaded externally so as to engage the thread provided on the nut end of tube 5.

In the drawings above referred to has been shown a simple and preferred form of the invention. It is, however, understood that no limitation is necessarily made to the precise structural details therein exhibited, but the right is hereby reserved to any changes, alterations or modifications to which recourse may be had that come within the scope of the following claims without departing from the spirit of the invention or sacrificing the efficiency of the same.

Having thus fully described our invention, what we claim as new and desire to secure by Letters Patent is:—

1. A demountable rim construction comprising in combination a felly having a rim therefor, a tire rim, a threaded connection between said rims, said rims having openings therein adapted to extend in alignment when said rims are connected together, an externally threaded tube adapted to extend within said openings for preventing relative movement of said rims, and a tire valve extension adapted to project through said tube beyond the felly substantially as and for the purpose specified.

2. An automobile rim construction comprising in combination a felly having a rim therefor, a tire rim surrounding said felly rim and having interlocking engagement therewith, said rims having openings therein adapted to extend in alignment when said rims are connected together, an externally threaded tube adapted to extend within said openings for preventing relative movement of said rims, and a tire valve extension adapted to project through said tube beyond the felly substantially as and for the purpose specified.

JOSEPH A. ROBY.
JOSEPH ZUNON TONDULT.